United States Patent
Bill

(10) Patent No.: US 7,778,258 B2
(45) Date of Patent: Aug. 17, 2010

(54) DISTRIBUTING PERSONALIZED CONTENT

(75) Inventor: David S. Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 12/143,381

(22) Filed: Jun. 20, 2008

(65) Prior Publication Data

US 2008/0256088 A1    Oct. 16, 2008

Related U.S. Application Data

(63) Continuation of application No. 09/105,840, filed on Jun. 26, 1998, now Pat. No. 7,394,816.

(51) Int. Cl.
*H04L 12/28* (2006.01)
*H04W 4/00* (2009.01)
*G06Q 30/00* (2006.01)
*G06F 15/16* (2006.01)

(52) U.S. Cl. .......... 370/400; 370/254; 370/338; 705/14; 705/26; 709/219; 709/224

(58) Field of Classification Search ......... 370/254–355, 370/390–422; 709/210–224; 707/2–10, 707/508–515; 705/14–27

See application file for complete search history.

(56) References Cited

U.S. PATENT DOCUMENTS

| | | | |
|---|---|---|---|
| 5,721,827 A * | 2/1998 | Logan et al. | 709/217 |
| 5,920,702 A | 7/1999 | Bleidt et al. | |
| 5,973,722 A | 10/1999 | Wakai et al. | |
| 5,996,014 A | 11/1999 | Uchihori et al. | |
| 6,005,597 A | 12/1999 | Barrett et al. | |
| 6,014,701 A | 1/2000 | Chaddha | |
| 6,041,239 A * | 3/2000 | Reed et al. | 455/453 |
| 6,097,720 A | 8/2000 | Araujo et al. | |
| 6,119,163 A | 9/2000 | Monteiro et al. | |
| 6,122,658 A | 9/2000 | Chaddha | |
| 6,208,988 B1 * | 3/2001 | Schultz | 707/5 |
| 6,253,375 B1 | 6/2001 | Gordon et al. | |
| 6,266,649 B1 * | 7/2001 | Linden et al. | 705/26 |
| 6,317,722 B1 * | 11/2001 | Jacobi et al. | 705/14 |
| 6,345,293 B1 * | 2/2002 | Chaddha | 709/219 |
| 6,363,383 B1 | 3/2002 | Kindo et al. | |
| 6,460,036 B1 * | 10/2002 | Herz | 707/10 |
| 6,530,083 B1 | 3/2003 | Liebenow | |
| 6,687,703 B2 | 2/2004 | Kindo et al. | |
| 6,912,505 B2 * | 6/2005 | Linden et al. | 705/14 |
| 7,003,519 B1 * | 2/2006 | Biettron et al. | 707/6 |
| 7,096,486 B1 | 8/2006 | Ukai et al. | |
| 7,113,917 B2 * | 9/2006 | Jacobi et al. | 705/14 |

(Continued)

*Primary Examiner*—M. Phan
(74) *Attorney, Agent, or Firm*—Fish & Richardson P.C.

(57) ABSTRACT

The invention provides a method and system for distributing personalized content to potentially large numbers of recipients. A pool is selected, from among all content available for distribution, of those content elements that will be made available for simultaneous distribution, and personalized content is selected for distribution from that pool. The content of the pool can change with new selections over time. For each individual recipient, content elements in the pool are examined to determine if they are predicted to be of sufficient interest to that recipient for distribution, and if so, those content elements are distributed. If not, successive content elements in the pool are examined, relaxing the standard for sufficient interest, until at least one content element is found and distributed to the individual recipient.

23 Claims, 2 Drawing Sheets

U.S. PATENT DOCUMENTS

| | | |
|---|---|---|
| 7,162,487 B2 | 1/2007 | Kindo et al. |
| 7,254,552 B2 * | 8/2007 | Bezos et al. ................... 705/26 |
| 7,308,425 B2 * | 12/2007 | Bezos et al. ................... 705/26 |
| 7,483,871 B2 * | 1/2009 | Herz ............................. 707/2 |
| 2004/0054572 A1 * | 3/2004 | Oldale et al. .................. 705/10 |
| 2007/0174866 A1 | 7/2007 | Brown et al. |
| 2009/0248682 A1 * | 10/2009 | Hueter et al. .................. 707/5 |

* cited by examiner

DISTRIBUTING PERSONALIZED CONTENT

CROSS-REFERENCE TO RELATED APPLICATION

This application is a continuation (and claims the benefit of priority under 35 USC 120) of U.S. application Ser. No. 09/105,840, filed Jun. 26, 1998, which issues Jul. 1, 2008 as U.S. Pat. No. 7,394,816.

BACKGROUND OF THE INVENTION

1. Field of the Invention

This invention relates to distributing personalized content.

2. Related Art

Known distribution systems for content include broadcast systems, such as broadcast radio and broadcast television, and personalized systems, such as direct purchases of records and videotapes. Recent developments in content distribution include digital storage of content and digital distribution of content, including both audio and video. For example, it is now possible to store popular songs on disk and distribute those songs to recipients using a communication network.

One problem in the known art is that distributing personalized information greatly increases the bandwidth used for distribution. At any one moment, each individual recipient can have different desires for content, so a large number of recipients can use substantial amounts of distribution bandwidth. Distribution bandwidth includes both the communication infrastructure to transmit that content to recipients, as well as the infrastructure to retrieve that content from storage and present that content to the communication infrastructure. For example, while it can be relatively easy to store several thousand songs on magnetic media, it is still relatively difficult to retrieve more than a few dozen of those songs from magnetic media simultaneously.

Accordingly, it would be desirable to distribute personalized content to potentially large numbers of recipients, without incurring the problems of the known art. This advantage is achieved in an embodiment of the invention in which a pool is selected, from among all content available for distribution, of those content elements that will be made available for simultaneous distribution, and personalized content is selected for distribution from that pool.

SUMMARY OF THE INVENTION

The invention provides a method and system for distributing personalized content to potentially large numbers of recipients. A pool is selected, from among all content available for distribution, of those content elements that will be made available for simultaneous distribution, and personalized content is selected for distribution from that pool. The content of the pool can change with new selections over time. For each individual recipient, content elements in the pool are examined to determine if they are predicted to be of sufficient interest to that recipient for distribution, and if so, those content elements are distributed. If not, successive content elements in the pool are examined, relaxing the standard for sufficient interest, until at least one content element is found and distributed to the individual recipient.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general or special purpose processors under program control, or other circuits, adapted to particular process steps and data structures described herein, and that implementation of the process steps and data structures described herein would not require undue experimentation or further invention.

System Elements

Figure 1:
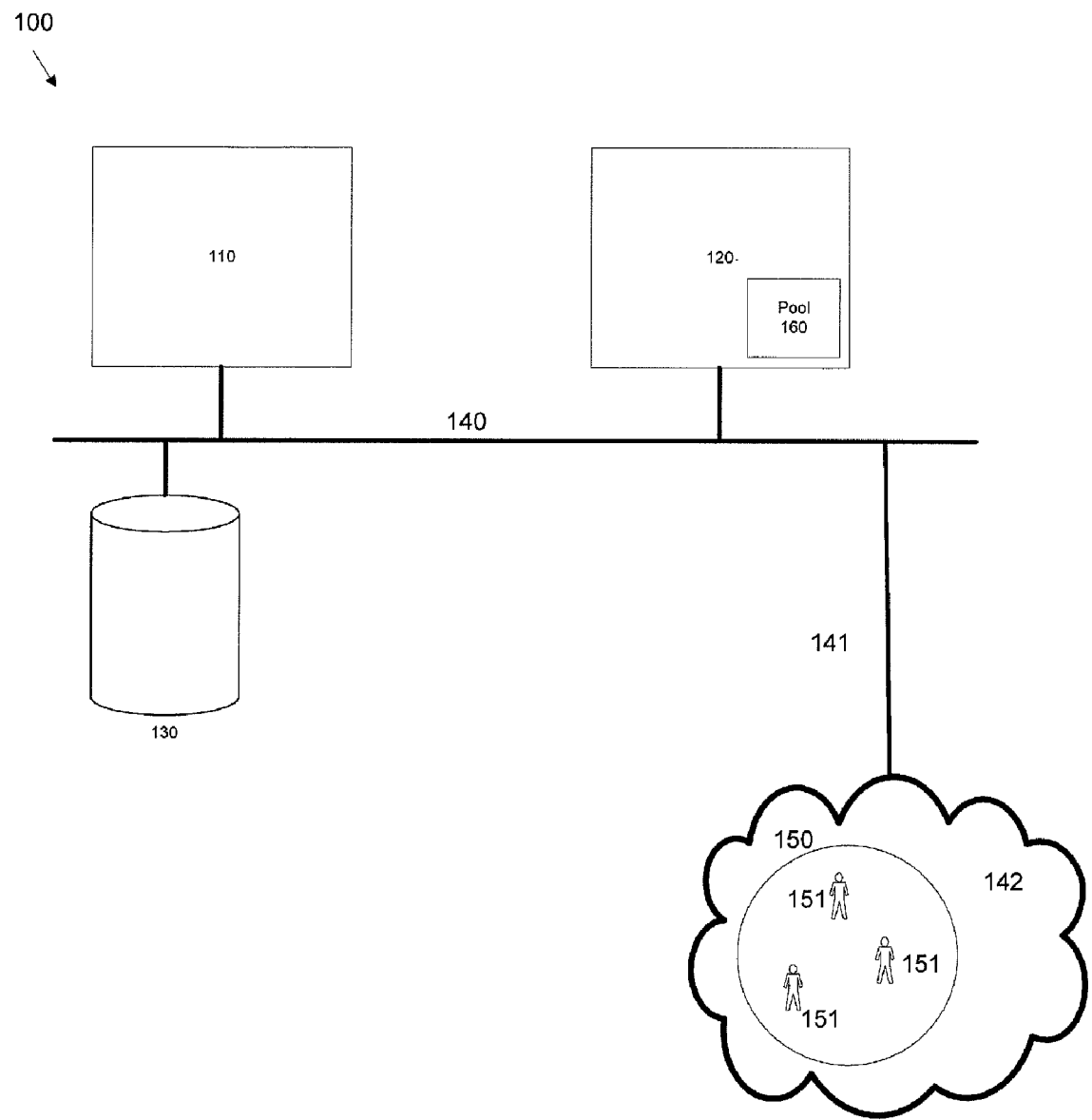
FIG. 1 shows a diagram of a system for distributing personalized content.

FIG. 1 shows a diagram of a system for distributing personalized content.

A system 100 for distributing personalized content includes a processor 110, program and data memory 120, mass storage 130, and a communication path 140 to a community 150 of individual recipients.

The processor 110 and memory 120 include any one of a set of known processors, operating under control of operating system and application programs in the memory 120. The mass storage 130 includes magnetic, optical, or magneto-optical storage suitable for maintains large amounts of data and delivering segments of that data to the memory 120 upon instruction by the processor 110.

The mass storage 130 maintains a relatively large number of content elements. In a preferred embodiment, each content element comprises an audio song in a digital format, such as an AU format, a WAV format, (preferably) a "Real Audio" or "Real Player" format, or another known format. Storage and delivery of all of these digital formats are known in the art. For example, in a preferred embodiment, the mass storage 130 maintains about 80,000 songs.

The invention is described herein with primary regard to delivery of audio songs in a digital format. However, the invention has wide applicability to delivery of other content elements, including other types of data and other types of format. For example, the invention is applicable to delivery of music videos, other audiovisual or video elements, graphic elements, mapping information, seismic information, telemetry information, or other known data in addition to or in combination therewith.

Network Distribution

The communication path 140 includes a communication link 141 (such as a T1 connection or a similar link) to a communication network 142 (such as the internet or a similar network). The communication link 141 is disposed for transmitting data from the memory 120 at a rate sufficient to deliver each content element to the community 150 of individual recipients, so that each individual recipient 151 in the community 150 receives content elements substantially in real time.

The communication network 142 is disposed for transmitting data from the communication link 141 to each individual recipient 151 in the community 150 at a rate sufficient to deliver each content element to each individual recipient 151 in the community 150 substantially in real time.

In alternative embodiments, the communication network 142 may be disposed for transmitting data to sets of individual recipients 151 in the community 150 using a multicast distribution technique, such as IP multicast.

Each content element maintained on the mass storage 130 is assigned to one or more channels for distribution.

In a preferred embodiment, each channel includes a recognizable genre or subdivision of known music, such as for example "Big Bands," "Classical," "Country & Western," "Heavy Metal," "Love Songs," "1950s," and the like. For example, in a preferred embodiment, each song maintained on the mass storage 130 is assigned to one or more of about 100 or so channels. Channels can, but need not, be assigned numeric or alphanumeric identifiers.

Each channel comprises content elements that are thought to appeal to substantially the same set of individual recipients 151 in the community 150.

For example, content elements are assigned to the channel "Country & Western" because it is believed that they will all have appeal to a group of individual recipients 151 in the community 150 who like "Country & Western" songs.

However, within each particular channel, those individual recipients 151 who receive content elements from that particular channel often have differing likes and dislikes. For each particular channel, the content elements on that channel do not necessarily have the same appeal to each individual recipient 151 receiving content elements from that channel.

Distribution Pool

For each particular channel, the system 100 maintains a pool 160 in the memory 120 of selected content elements assigned to that channel.

Those content elements selected for the pool 160 are maintained in the memory 120 to be distributed to individual recipients 151. The pool 160 is more than one such content element, but smaller than the entire collection of content elements on the mass storage 130.

The processor 110 and memory 120 are disposed to be able to deliver substantially all the content elements in the pool 160 simultaneously and substantially in real time.

In alternative embodiments, the pool 160 can be maintained on the mass storage 130 in addition to or instead of in the memory 120. The pool 160 is limited only by the ability of the system 100 to retrieve and deliver substantially all of the content elements in the pool 160 simultaneously.

In a preferred embodiment, the pool 160 comprises about 30 content elements for each channel. The inventor has found that this is a sufficient large number that, at any particular time, virtually every individual recipient 151 will have at least one content element they will enjoy. The inventor has also found that this is a sufficiently small number that the processor 110 and memory 120 are not substantially taxed by attempting to deliver all content elements in the pool 160 simultaneously.

In alternative embodiments, the number of content elements in the pool 160 could be different. The number of content elements in the pool 160 may be selected in response to various factors, in addition to or instead of the factors noted above.

The number may be adaptive to the predicted composition of the community 150, which itself may be responsive to the time of day or day of the week.

The number may be adaptive to requests from individual recipients 151 or to ratings from individual recipients 151.

The number may be adaptive to the size or type of content elements in the pool 160. For example, one video element might require substantially more resources to deliver than one audio element, and thus might be considered to occupy a larger proportion of the pool 160.

The number may be adaptive to priorities assigned to content elements in the pool 160, or to other administrative requirements.

The content elements in the pool 160 are replaced from time to time; thus, the pool 160 does not comprise the same content elements at all times.

In a preferred embodiment, each content element in the pool 160 has a known play length, which is the amount of time it takes to play that song in real time. Each song is retained in the pool 160 for its play length (plus any amount of time required to actually distribute the song if it has been selected for distribution to individual recipients 151). After a particular content element is ready for replacement, the processor 110 selects a new content element from the entire set of content elements (for that particular channel) to enter into the pool 160.

In alternative embodiments, the content elements in the pool 160 may be replaced in response to other factors, in addition to or instead of play length:

The entire pool 160 may be selected for replacement en masse, either periodically, in response to some random factor, or in response to some other factor such as feedback from the community 150.

Individual content elements in the pool 160 may be selected for replacement earlier or later than their play length, in response to some random factor, in response to feedback from the community 150, or in response to failure to be selected for distribution.

Personalized Distribution

For each individual recipient 151 requesting personalized distribution, there are times when a content element is selected for personalized distribution to that individual recipient 151. At those times, the content element is selected from the pool 160. After examining at least one such content element, the processor 110 selects one content element for distribution to that individual recipient 151. After that one content element is distributed to that individual recipient 151 (and if the individual recipient 151 still desires personalized distribution) the processor 110 continues to examine content elements in the pool 160 and select them for distribution to that individual recipient 151.

In a preferred embodiment, the processor 110 selects content elements for personalized distribution at times responsive to each individual recipient 151, such as when an individual recipient 151 specifically requests distribution of a content element, or when a previous content element ends, or triggered by a timer or other event.

In alternative embodiments, the processor 110 may select content elements for personalized distribution at times responsive to sets of individual recipients 151, such as when content elements are scheduled for multicast to a plurality of individual recipients 151. In such alternative embodiments, the processor 110 may give preference to those content elements scheduled for multicast. The preference may be expressed, for example, by adjusting the score of content elements responsive to that schedule or by restricting the selection for personalized distribution to those content elements.

The processor 110 selects a first content element from the pool 160, and determines a predicted interest by the individual recipient 151 in that first content element.

In a preferred embodiment, the first content element is selected from the pool in a weighted round robin manner. In alternative embodiments, the first content element may be selected in response to another technique, such as at random.

In a preferred embodiment, the processor 110 determines the predicted interest in response to a set of known correlation factors between the particular individual recipient 151 and other known groups of individual recipients 151 in the community 150. The processor 110 preferably uses a known CF (collaborative filtering) technique. CF techniques are known in the art of predicting audience response.

In alternative embodiments, where determining a predicted interest is relatively less resource-intensive, the processor 110 may make the determination using other techniques. For example, the processor 110 may make the determination for a larger number of content elements in the pool 160 (even for all of them). The processor 110 may make the determination for content elements not already in the pool 160 (for possible addition to the pool 160).

The processor 110 compares the predicted interest with a minimum interest threshold, to determine whether the first content element will probably be liked or disliked by the particular individual recipient 151.

In a preferred embodiment, both the predicted interest and the interest threshold are compared using dimensionless units. In this application these units are referred to as being on a scale of zero (worst) to ten (best). However, there is no special reason for the scale to have this particular granularity or these particular endpoint values.

In a preferred embodiment, the minimum interest threshold is initially set relatively high, to maximize the probability that the individual recipient 151 will like the song. For example, the initial minimum interest threshold is preferably set to about nine (on a scale of zero to ten).

The processor 110 also compares the first content element with a set of business rules, to determine whether distribution of the first content element will be disallowed for administrative reasons. Business rules have three possible types:

Legal restrictions imposed on distributing content elements, such as by licensing requirements. For example, the license for distributing songs can sometimes require that a particular song not be played more than twice in one hour, or that a particular artist's songs not be played more than three times in one hour.

Marketing restrictions imposed on distributing content elements, such as by perceived desires or needs of the community 150. For example, marketing considerations can dictate that a particular song not be played twice in a row, or that particular artist's songs not be played more than three times in a row, or that a "downbeat" song not be followed immediately by an "upbeat" song.

Other administrative, financial, or technical restrictions. For example, administrative considerations can dictate that song play cannot run over scheduled commercial breaks or station identification.

If the processor 110 determines that the content element meets the minimum interest threshold and the business rules, it distributes the content element tot the individual recipient 151.

If the processor 110 determines that the content element should not be distributed for either reason, it selects a second content element from the pool 160 and repeats the examination with regard to that second content element.

For each successive content element it examines, the processor 110 adjusts the minimum interest threshold downward. The processor 110 compares each of the content elements it has examined against the adjusted minimum interest threshold, and selects the best one.

Thus, if the first content element does not meet the relatively high initial threshold, both the first and second content elements are compared against a somewhat relaxed threshold.

If both the first and second content elements do not meet the relaxed threshold, a third content element is selected and all of the first, second, and third content elements are compared against a further relaxed threshold. This process is repeated until one of the following:

at least one content element meets a sufficiently relaxed threshold (and satisfies the business rules); or the processor 110 has examined a selected maximum number of content elements (possibly the entire pool 160).

In either case, the processor 110 distributes one content element it has examined that has the best predicted interest (and satisfies the business rules).

In a preferred embodiment, the minimum interest threshold is adjusted downward by multiplying the previous minimum interest threshold by a factor smaller than one. For example, this factor is preferably about 0.9.

In a preferred embodiment, the maximum number of content elements examined by the processor 110 is about half the size of the pool 160. For example, this number is preferably about 15.

In alternative embodiments, any of the values used for this process may be adaptively selected in response to a variety of factors:

The initial value for the minimum interest threshold can be adaptively selected in response to one or more of (1) the average predicted interest of all content elements in the pool 160 for the entire community 150, (2) the average expressed interest by the individual recipient 151 for content elements distributed to that individual recipient 151 in the past, (3) a measure of relative load on the processor 110, or other known factors.

The factor for reducing the minimum interest threshold, or the technique for adjusting the minimum interest threshold, can be adaptively selected in response to one or more of the factors noted above.

The maximum number of content elements examined by the processor, can be adaptively selected in response to one or more of the factors noted above.

In a preferred embodiment, the processor 110 selects content elements for personalized distribution separately for each channel.

In alternative embodiments, the individual recipient 151 can select a plurality of channels from which the processor 110 selects content elements for personalized distribution. In such alternative embodiments, the processor 110 can select content elements from a union of pools 160 for each channel, or using some other technique.

Method of Operation

Figure 2:
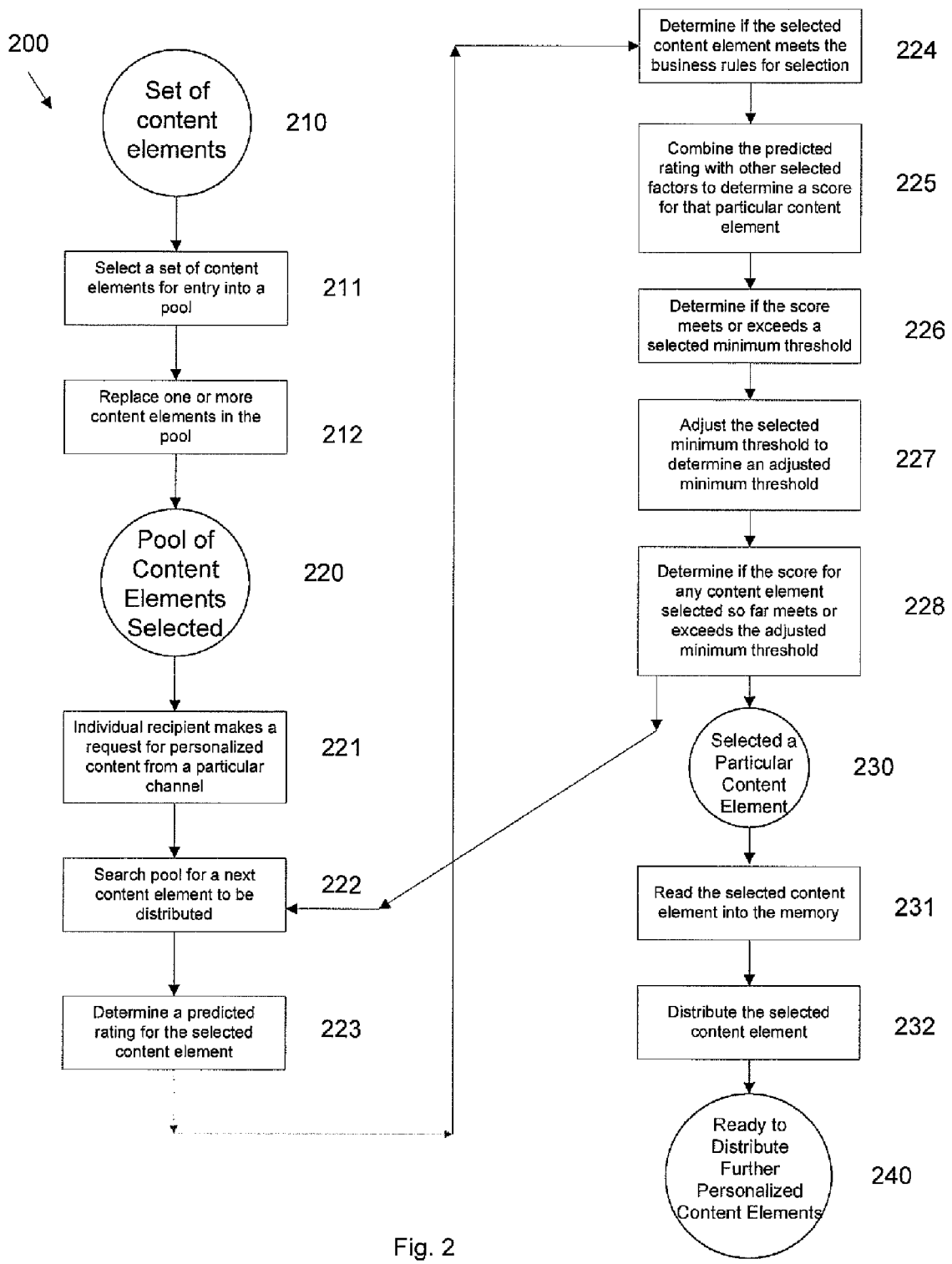
FIG. 2 shows a flow diagram of a method for distributing personalized content.

FIG. 2 shows a flow diagram of a method for distributing personalized content.

A method 200 is performed by the system 100, including the processor 110, memory 120, mass storage 130, and communication path 140.

Pool Selection

At a flow point 210, the system 100 has a set of content elements for distribution to the community 150.

At a step 211, the processor 110 selects a set of content elements for entry into the pool 160. As noted herein, the number of elements in the pool 160 is preferably about 30, but may be different and may be adaptive in response to factors noted herein, At a step 212, the processor 110 periodically replaces one or more content elements in the pool 160. As noted herein, the processor 110 preferably replaces each content element in the pool 160 after the duration of its play length. At that time, the processor 110 retains ejected content elements in the memory 120 if they are then currently being distributed, but marks them as ineligible for selection for personalized distribution.

In alternative embodiments, at the step 212, the processor 110 may periodically replace all of the content elements in the pool 160. For example, the processor 110 may perform this step periodically about every 30 seconds.

If the system 100 is reset for any reason, such as by a system failure or a reset forced by an operator, the method 200 returns to the flow point 210 and the processor 110 selects a new pool 160.

Content Element Selection

At a flow point 220, the system 100 has selected the pool 160 of content elements for personalized distribution to individual recipients 151 in the community 150.

At a step 221, an individual recipient 151 makes a request for personalized content from a particular channel (or as noted above, from a particular set of channels). The processor 110 receives the request and the method 200 proceeds with the next step.

At a step 222, the processor 110 searches the pool 160 for a next content element to be distributed. As noted herein, the particular method for search is preferably a weighted round robin technique, but there is no particular reason in the context of this invention for using any particular search technique.

At a step 223, the processor 110 determines a predicted rating for the selected content element. As noted herein, the processor 110 preferably uses a known CF technique.

At a step 224, the processor 110 determines if the selected content element meets the business rules for selection.

At a step 225, the processor 110 combines the predicted rating with other selected factors to determine a score for that particular content element.

In a preferred embodiment, violating any of the business rules bars distribution of the content element, so the processor 110 assigns the content element the lowest possible score (zero).

In alternative embodiments, violating licensing restrictions has the same effect, but violating marketing or administrative restrictions may have a less drastic effect. For example, the processor 110 can significantly reduce the score of the content element, but not reduce it to zero, for violating selected "soft" marketing business rules.

At a step 226, the processor 110 determines if the score meets or exceeds a selected minimum threshold for the individual recipient 151. As noted above, the initial value for the minimum threshold is about nine (on a scale of zero to ten), but may be different or may be adaptive responsive to a variety of factors.

If the score for the selected content element meets or exceeds the selected minimum threshold, the method 200 proceeds with the flow point 230, and the content element is distributed to the individual recipient 151.

If the score for the selected content element does not meet the selected minimum threshold, the method 200 proceeds with the next step.

At a step 227, the processor 110 adjusts the selected minimum threshold to determine an adjusted minimum threshold. As noted above, the processor 110 preferably multiplies the selected minimum threshold by a factor less than one, such as 0.9, but in alternative embodiments the factor may be different or may be adaptive in response to various factors.

At a step 228, the processor 110 determines if the score for any content element selected so far meets or exceeds the adjusted minimum threshold.

If one or more content elements selected so far meet or exceed the adjusted minimum threshold, the processor 110 selects the content element with the highest score. The method 200 proceeds with the flow point 230, and that content element is distributed to the individual recipient 151.

If none of the content elements selected so far meet or exceed the adjusted threshold, the method 200 returns to the step 222, and a next content element is selected.

As noted herein, the method 200 returns to the step 222 only a selected maximum number of times. In a preferred embodiment, this selected maximum number is about 15. In alternative embodiments, this selected maximum number may be different or may be adaptive in response to various factors.

If the selected maximum number of returns to the step 222 would be exceeded, the processor 110 selects the content element with the highest score, similarly to the case when that score did meet or exceed the adjusted minimum threshold. Similarly, the method 200 proceeds with the flow point 230, and that content element is distributed to the individual recipient 151.

Content Element Distribution

At a flow point 230, the system 100 has selected a particular content element for distribution to the individual recipient 151.

At a step 231, the processor 110 reads the selected content element into the memory 120 from the mass storage 130 (if the selected content element is not already in the memory 120).

At a step 232, the processor 110 distributes the selected content element from the memory 120, using the communication path 140, to the individual recipient 151.

At a flow point 240, the system 100 has distributed the selected content element to the individual recipient 151, and is ready to distribute further personalized content elements. The method 200 proceeds with the flow point 230.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A method of generating a theme-based channel of music for an Internet Radio station, the method comprising:
   determining a score for one content element within a set of content elements that share a theme of the theme-based channel of music, the score being responsive to a predicted recipient interest in the one content element;
   determining a number of times that the one content element was perceived by the requestor over a predetermined time period;
   comparing the number of times with a count threshold;
   determining, based on the comparison of the number of times with the count threshold, if the number of times is equal to or greater than the count threshold; and
   adjusting, based on the determination that the number of times is equal to or greater than the count threshold, the score for the one content element to decrease the likelihood that the one content element is selected;
   comparing the score for the one content element with a threshold;

selecting, based on the comparing of the score for the one content element with the threshold, the one content element;

scheduling the selected one content element to be available to users requesting the theme-based channel of music;

receiving a request from a requestor for access to the theme-based channel of music; and enabling perception, based in part on the received request from the requestor for access to the theme-based channel of music, of the scheduled one content element by the requestor.

2. The method of claim 1 further comprising:

determining whether the one content element is the same as the scheduled content element most recently perceived by the requestor; and adjusting, based on the determination that the one content element is the same as the scheduled content element most recently perceived by the requestor, the score for the one content element to decrease the likelihood that the one content element is selected.

3. A method of generating a theme-based channel of music for an Internet Radio station, the method comprising:

determining a score for one content element within a set of content elements that share a theme of the theme-based channel of music, the score being responsive to a predicted recipient interest in the one content element;

determining a characteristic of the one content element;

determining a number of times content elements sharing the characteristic of the one content element were perceived by the requestor over a predetermined time period;

comparing the number of times with a count threshold;

determining, based on the comparison of the number of times with the count threshold, if the number of times is equal to or greater than the count threshold; and adjusting, based on determination that the number of times is equal to or greater than the count threshold, the score for the one content element to decrease the likelihood that the one content element is selected;

comparing the score for the one content element with a threshold;

selecting, based on the comparing of the score for the one content element with the threshold, the one content element;

scheduling the selected one content element to be available to users requesting the theme-based channel of music;

receiving a request from a requestor for access to the theme-based channel of music; and enabling perception, based in part on the received request from the requestor for access to the theme-based channel of music, of the scheduled one content element by the requestor.

4. The method of claim 3 wherein determining the characteristic of the one content element comprises determining an artist of the one content element.

5. The method of claim 3 wherein determining the characteristic of the one content element comprises determining a melody of the one content element.

6. A method of generating a theme-based channel of music for an Internet Radio station, the method comprising:

determining a score for one content element within a set of content elements that share a theme of the theme-based channel of music, the score being responsive to a predicted recipient interest in the one content element;

determining a characteristic of the one content element;

determining whether the scheduled content element most recently perceived by the requestor shares the characteristic of the one content element; and adjusting, based on the determination that the scheduled content element most recently perceived by the requestor shares the characteristic of the one content element, the score for one content element to decrease the likelihood that the one content element is selected comparing the score for the one content element with a threshold;

selecting, based on the comparing of the score for the one content element with the threshold, the one content element;

scheduling the selected one content element to be available to users requesting the theme-based channel of music;

receiving a request from a requestor for access to the theme-based channel of music; and enabling perception, based in part on the received request from the requestor for access to the theme-based channel of music, of the scheduled one content element by the requestor.

7. The method of claim 6 wherein determining the characteristic of the one content element comprises determining an artist of the one content element.

8. The method of claim 6 wherein determining the characteristic of the one content element comprises determining a melody of the one content element.

9. A method of generating a theme-based channel of music for an Internet Radio station, the method comprising:

determining a score for one content element within a set of content elements that share a theme of the theme-based channel of music, the score being responsive to a predicted recipient interest in the one content element;

determining a characteristic of the one content element;

determining whether the scheduled content element most recently perceived by the requestor shares the characteristic of the one content element; and reducing, based on the determination that the scheduled content element most recently perceived by the requestor shares the characteristic of the one content element, the score for the one content element comparing the score for the one content element with a threshold;

selecting, based on the comparing of the score for the one content element with the threshold, the one content element;

scheduling the selected one content element to be available to users requesting the theme-based channel of music;

receiving a request from a requestor for access to the theme-based channel of music; and enabling perception, based in part on the received request from the requestor for access to the theme-based channel of music, of the scheduled one content element by the requestor.

10. The method of claim 9 wherein determining the characteristic of the one content element comprises determining an artist of the one content element.

11. The method of claim 9 wherein determining the characteristic of the one content element comprises determining a melody of the one content element.

12. The method of claim 1 further comprising removing, in response to enabling perception of the scheduled content element, the scheduled content element from the set of content elements that share the theme of the theme-based channel of music.

13. A method of generating a theme-based channel of music for an Internet Radio station, the method comprising:

determining a score for one content element within a set of content elements that share a theme of the theme-based channel of music, the score being responsive to a predicted recipient interest in the one content element;

comparing the score for the one content element with a threshold;

selecting, based on the comparing of the score for the one content element with the threshold, the one content element;

scheduling the selected one content element to be available to users requesting the theme-based channel of music;

receiving a request from a requestor for access to the theme-based channel of music; and enabling perception, based in part on the received request from the requestor for access to the theme-based channel of music, of the scheduled one content element by the requestor;

determining a score for a second content element within the set of content elements that share the theme of the theme-based channel of music, the score being responsive to a predicted recipient interest in the second content element;

adjusting the threshold;

comparing the score for the second content element with the adjusted threshold;

selecting, based on the comparing of the score for the second content element with the adjusted threshold, the second content element;

scheduling the selected second content element to be available to users requesting the theme-based channel of music; and enabling perception, based in part on the availability of the selected second content element, of the scheduled second content element by the requestor.

14. The method of claim 13 wherein adjusting the threshold comprises adjusting the threshold based on a determination that the one content element was not selected.

15. The method of claim 13 wherein adjusting the threshold comprises adjusting the threshold to increase the likelihood that the second content element is selected.

16. The method of claim 13 wherein adjusting the threshold comprises adjusting the threshold downward.

17. The method of claim 16, wherein adjusting the threshold downward comprises lowering the threshold by 10%.

18. The method of claim 13 wherein the adjusted threshold is different than the threshold compared to the score for the one content element.

19. The method of claim 1 wherein the threshold is determined based on the average predicted recipient interest of all of the content elements in the set of content elements that share the theme of the theme-based channel of music.

20. The method of claim 1 wherein the threshold is determined based on the average predicted recipient interest of all of the content elements previously perceived by the requestor.

21. The method of claim 1 further comprising:
replacing at least one content element in the set of content elements that share the theme of the theme-based channel of music at a predetermined time interval.

22. The method of claim 1 wherein the predicted recipient interest in the one content element is determined using a collaboration filtering technique.

23. The method of claim 1 wherein the receiving of the request from the requestor for access to the theme-based channel of music occurs after the scheduling of the selected one content element to be available to users requesting the theme-based channel of music.

* * * * *